Figure 1:
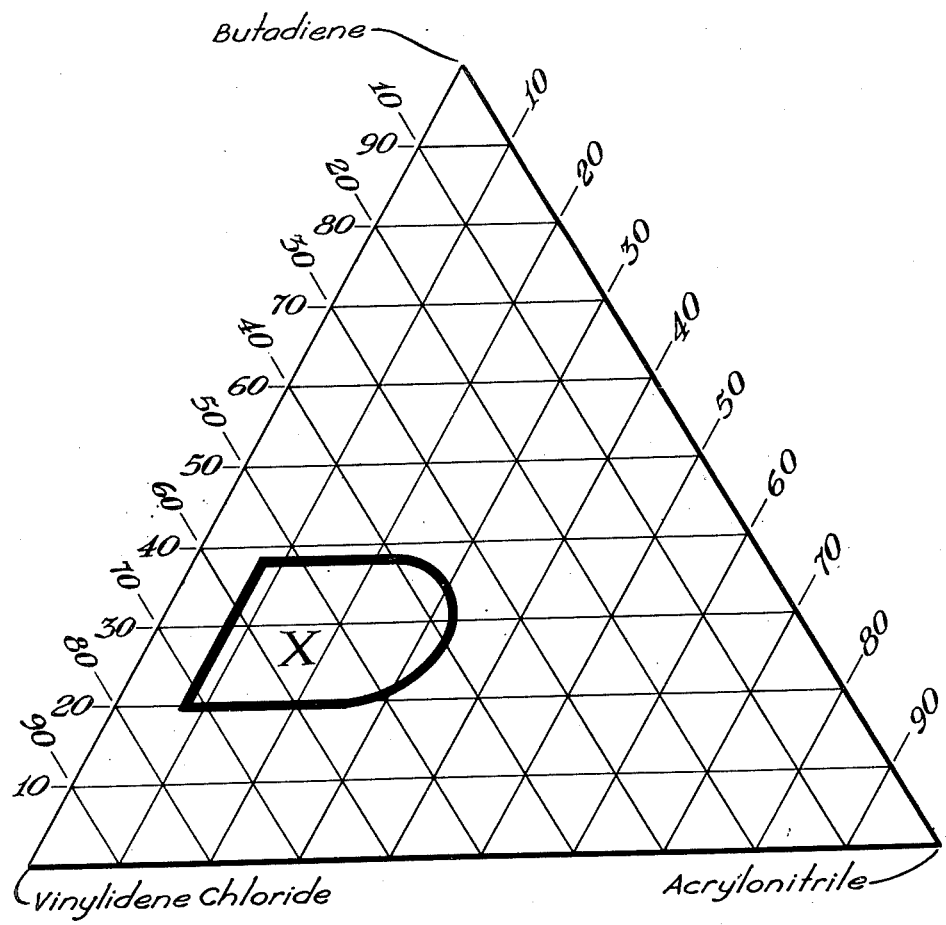

INVENTORS.
George W. Stanton
Charles Everett Lowry
BY
Griswold & Burdick
ATTORNEYS Patented Sept. 13, 1949

2,482,073

UNITED STATES PATENT OFFICE 2,482,073

VINYLIDINE CHLORIDE-BUTADIENE-ACRYLONITRILE INTERPOLYMERS

George William Stanton and Charles Everett Lowry, Midland, Mich., assignors to The Dow Chemical Company, Midland, Mich., a corporation of Delaware Application May 16, 1946, Serial No. 670,279

3 Claims. (Cl. 260—80.7)

This invention relates to interpolymers containing at least three components, including vinylidene chloride, butadiene-1,3 and acrylonitrile. It relates in particular to ternary interpolymers of the named polymerizable compounds, in proportions exhibiting improved rubber-like properties as compared with the properties of the three corresponding binary interpolymers.

The plastic interpolymers of vinylidene chloride and acrylonitrile, or other alpha-methylene nitriles, are described by Hanson and Goggin, in U. S. Patent No. 2,238,020. Rubber-like interpolymers of butadiene-1,3 and acrylonitrile have long been known. More recently, both rubber-like and plastic interpolymers of butadiene-1,3 and vinylidene chloride have been described by Sebrell, in U. S. Patent No. 2,215,379; Tucker, in U. S. Patent No. 2,376,208; and Youker, in U. S. Patent No. 2,380,356. Each of these binary compositions has some very useful and valuable properties, but each is defective in some respects for certain desired uses. In the following description, the term "butadiene" refers to the compound butadiene-1,3.

The vinylidene chloride-acrylonitrile binary interpolymers are thermoplastic, but, when cold, they are rigid and non-rubbery. The acrylonitrile-butadiene interpolymers range from rigid thermoplastics at high acrylonitrile concentrations to rubbery materials at high butadiene concentrations. While the latter rubbery interpolymers have high elongation values they are very weak in the unvulcanized state. Even the cured butadiene-acrylonitrile rubber-like compositions have not been found useful in tires, because of a tendency to flex-crack, and for other reasons. The vinylidene chloride-butadiene binary interpolymers range from rigid, thermoplastic and highly insoluble materials at high vinylidene chloride concentrations, through strong rubbers near the center of the range, to weak factice-like materials at high butadiene concentrations. The best rubbery materials for most purposes among the last-named binary interpolymers are those containing from about 20 to about 50 per cent of butadiene, but these products have relatively poor abrasion resistance after vulcanization, and, for some purposes are considered deficient in such properties as flow viscosity, solvent and chemical resistance and dielectric values, and have a tendency toward excessive heat build-up.

It is accordingly among the objects of the present invention to provide a rubbery interpolymer having a useful combination of tensile strength and elongation characteristics, and having improved abrasion resistance and increased solvent resistance as compared with the rubbery binary interpolymers of vinyidene chloride and butadiene. A particular object is to provide a rubbery interpolymer as aforesaid, having an improved combination of tensile strength and elongation characteristics, as compared with the rubbery binary interpolymers of acrylonitrile and butadiene, while still exhibiting at least as great a resistance to solvents as do those interpolymers. Another object is to provide a rubber interpolymer as aforesaid, having the stated desired combination of properties, and composed of vinylidene chloride, acrylonitrile and butadiene. A specific object is to provide such an interpolymer having a "tensile-elongation product" of at least 300. Other and related objects may appear hereinafter.

The term "tensile-elongation product" is employed herein to describe an arbitrary unit of property (toughness) measurement, and is the number obtained by multiplying the tensile strength (in pounds per square inch) of the interpolymer by its elongation value (per cent) and dividing the result by 1,000. This unit, representing a combination of tensile and elongation characteristics, is believed to give a better indication of the rubbery nature of an interpolymer than can either the tensile or the elongation value alone. Thus, for many purposes, a product of great strength is not a useful rubber if it is so rigid that it cannot be stretched considerably, at least in the unvulcanized state. Also, an extremely weak product is not a useful rubber simply because it is capable of great elongation. Employing the formula defined above, it has been determined that the best and most useful rubbers, for most industrial applications, have tensile-elongation products of at least 300, in the unvulcanized state. The term "interpolymer" is used herein to mean the product obtained by the polymerization of a mixture of three or more monomers. To distinguish from the ternary "interpolymers," the term "copolymer" is arbitrarily used herein to designate a product similarly derived from a mixture of two monomers.

It has now been found that the foregoing and related objects may be attained, and that new and useful rubbery interpolymers having tensile-elongation products of 300 or greater, are the ternary interpolymerization products of vinylidene chloride, butadiene and acrylonitrile made from these monomers in the proportions represented by area X in Fig. 1 of the accompanying drawing, and it has been found, further, that these new ternary interpolymers are capable of being vulcanized to become more resistant to abrasion and to the action of solvents and chemicals than are the binary copolymers containing like proportions of the respective ingredients. Other advantages for the new interpolymers are pointed out below.

Figure 2:
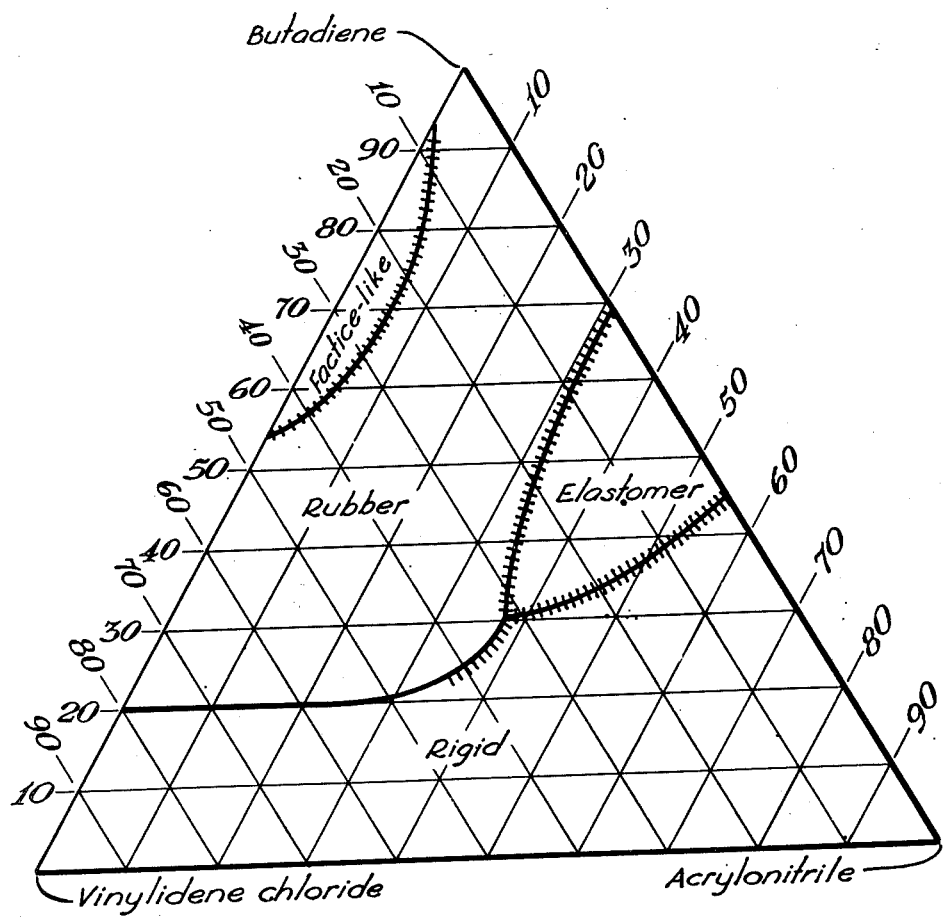

In the said annexed drawing, forming a part of the present specification,

Fig. 1 is a ternary composition chart on which the preferred new compositions are defined as area X; and Fig. 2 is another ternary composition diagram of the same interpolymers, showing in general terms the character of interpolymers obtained from the monomer mixtures represented by all proportions of the ternary system of vinylidene chloride, butadiene and acrylonitrile. For this purpose, certain dividing lines have been established, based arbitrarily on elongation values of the unvulcanized interpolymers, as follows: the area marked "rubber" represents interpolymers having elongation values greater than 250 per cent; the area marked "elastomer" represents interpolymers having elongation values between 50 and 250 per cent; the area marked "rigid" represents interpolymers which have good strength but elongation values less than 50 per cent; and the area marked "factice-like" represents interpolymers of low strength (usually less than 150 pounds per square inch) and low elongation values (usually less than 250 per cent), with a "tensile-elongation product" under 75, and is of such a character as to be of little use in the unvulcanized state, at least when prepared in the manner here described. Certain of the boundaries shown on Fig. 2 are necessarily shown as shaded lines, to represent a gradation from one classification to the other. None of these gradations, however, is significant to the area X on Fig. 1, because of the clear division made possible by the tensile-elongation product. It may not be concluded from Fig. 2 that all compositions in the "rubber" area are equivalent in properties, as this is definitely not the case.

The ternary interpolymers of the present invention are most conveniently made by the emulsion polymerization process, preferably employing a mildly alkaline aqueous medium as the continuous phase. The new interpolymers have also been made in emulsion using the acidic conditions and catalyst described by Britton and LeFevre in U. S. Patent No. 2,333,633. They have also been made in aqueous suspension, without emulsifying agents, using benzoyl peroxide as the catalyst. For the present purposes of comparison between the various compositions in the interpolymer system of vinylidene chloride, butadiene and acrylonitrile, a standard polymerization procedure was adopted, eliminating as far as possible any variations due to changes in relative concentrations of the disperse and continuous phases, catalysts, temperature, emulsifiers, alkalies, and the like. The standard procedure for small scale preparations is as follows:

A stock solution is prepared consisting of 98.5 per cent by weight of pure water, 1 per cent of a purified grade of sodium lauryl sulfate, and 0.5 per cent of sodium carbonate. To 75 parts by weight of the aqueous stock solution is added 25 parts by weight of the chosen monomers in the proportions being investigated, and 0.125 per cent of potassium persulfate is added as a catalyst. The mixture is emulsified by agitation and is kept at a constant temperature of 55° C. in a sealed vessel until polymerization has progressed to the desired extent. There is then added a small amount, suitably about 0.4 per cent, of an antioxidant such as polymerized trimethyl dihydroquinoline. The latex is then coagulated, after dilution with water, by addition of a 50 per cent aqueous methanol solution, containing 0.4 per cent of magnesium chloride. The coagulum is washed with water and vacuum dried at 70° C. overnight. When making batches involving more than about a gallon of reaction medium, the stock solution is fortified to contain 1.5 per cent of the emulsifying agent and 0.75 per cent of sodium carbonate, the amount of monomers is correspondingly increased to 33.3 per cent of the weight of the emulsion, and the catalyst concentration is increased to 0.165 per cent of potassium persulfate.

The improved and preferred rubbery interpolymers of the present invention may be prepared in the manner outlined above, and are those made from a monomer mixture containing not less than 37 nor more than 72 per cent of vinylidene chloride, not less than 20 and up to about 38 per cent of butadiene, and not less than 7 and up to about 33 per cent of acrylonitrile, all as defined by area X on Fig. 1 of the accompanying drawing. The tensile strength and elongation values used in computing the tensile-elongation products, from which area X was defined, were determined on compression molded samples of the dried, unmodified interpolymers which was fed to the molding machine in a form analogous to that of crude rubber. Thus, the masking or modifying effects of fillers, compounding agents, and similar materials, was eliminated from these determinations. The moldings were made at 135° C., all at a uniform pressure, and were aged overnight at constant humidity before testing on a standard "Scott IP4" tester. Each determination was made on four separate samples of identical composition, and the average values were plotted.

Following are data representative of those on which are based, in part, the area X on Fig. 1 of the drawing, and the various areas on Fig. 2.

Table

| Monomer Composition, Percent by Weight | | | Interpolymer Properties | | | |
|---|---|---|---|---|---|---|
| Vinylidene Chloride | Acrylo-nitrile | Buta-diene | Tensile Strength, p. s. i. | Elongation, Percent | Tensile Elongation Product | Permanent Set, Percent |
| 80 | 0 | 20 | 2,008 | 34 | 68 | 6 |
| 70 | 0 | 30 | 716 | 643 | 461 | 4 |
| 63 | 7 | 30 | 939 | 552 | 518 | 2 |
| 59.4 | 10.6 | 30 | 717 | 631 | 453 | 2 |
| 56 | 14 | 30 | 732 | 568 | 416 | 1 |
| 52.5 | 17.5 | 30 | 512 | 610 | 312 | 1 |
| 49 | 21 | 30 | 871 | 477 | 416 | 5 |
| 42 | 28 | 30 | 928 | 438 | 407 | 3 |
| 38.5 | 31.5 | 30 | 912 | 375 | 342 | 4 |
| 35 | 35 | 30 | 898 | 266 | 239 | 5 |
| 31.5 | 38.5 | 30 | 1,038 | 214 | 222 | 7 |
| 28 | 42 | 30 | 1,206 | 30 | 36 | 0 |
| 21 | 49 | 30 | 1,060 | 23 | 23 | 0 |
| 14 | 56 | 30 | 823 | 0 | 0 | 0 |
| 7 | 63 | 30 | 877 | 18 | 16 | 0 |
| 0 | 70 | 30 | 592 | 7 | 4 | 1.5 |
| 55 | 0 | 45 | 437 | 403 | 176 | 1 |
| 44 | 11 | 45 | 456 | 333 | 152 | 2 |
| 33 | 22 | 45 | 474 | 328 | 155 | 3 |
| 22 | 33 | 45 | 355 | 230 | 82 | 1 |
| 16.5 | 38.5 | 45 | 446 | 178 | 79 | 0 |
| 11 | 44 | 45 | 466 | 159 | 74 | 2 |
| 8.3 | 46.7 | 45 | 686 | 158 | 108 | 2 |
| 5.5 | 49.5 | 45 | 655 | 130 | 85 | 1 |
| 2.7 | 52.3 | 45 | 353 | 79 | 28 | 2 |
| 0 | 55 | 45 | 502 | 87 | 44 | 1 |
| 30 | 0 | 70 | 155 | 201 | 31 | 1 |
| 27 | 3 | 70 | 143 | 220 | 31 | 1 |
| 25.5 | 4.5 | 70 | 120 | 150 | 18 | 0 |
| 24 | 6 | 70 | 134 | 171 | 23 | 1 |
| 22.4 | 7.6 | 70 | 138 | 557 | 77 | 18 |
| 21 | 9 | 70 | 147 | 267 | 39 | 1 |
| 18 | 12 | 70 | 147 | 432 | 64 | 16 |
| 12 | 18 | 70 | 153 | 494 | 76 | 48 |
| 6 | 24 | 70 | 143 | 550 | 79 | 71 |
| 0 | 30 | 70 | 134 | 487 | 65 | 77 |
| 0 | 0 | 100 | 226 | 350 | 79 | 7 |
| GR-S (for comparison) | | | 107 | 1,750 | 187 | 58 |

The extremely low permanent set values for these uncompounded and uncured samples show the new interpolymers to be superior in this respect to the butadiene-acrylonitrile, the butadiene-styrene, and many of the other binary synthetic "crude" rubbers heretofore known.

Other data, similar to those presented above, were employed in completing the boundaries shown on Fig. 2 of the drawing, and all these data, together with the results of abrasion tests, solvent resistance, and other determinations made on compounded, cured and vulcanized samples, were used in establishing the boundaries shown on Fig. 1.

To obtain representative and comparable values in those tests carried out on compounded and vulcanized batches of the ternary interpolymers here concerned, a standard procedure was developed and two standard formulations were employed. The standard compositions, hereinafter referred to as Formulation A and Formulation B, contained the following ingredients in the designated parts, by weight:

| | Formulation A | Formulation B |
|---|---|---|
| Interpolymer | 100 | 100 |
| Stearic Acid | 1 | 1 |
| Butyl phthalyl butylglycolate (plasticizer) | 10 | |
| Pine Tar | | 10 |
| Litharge | 5 | 5 |
| Benzothiazyl disulfide (accelerator) | 1 | 1 |
| Sulfur | 2 | 2 |
| EPC Black | 35 | |
| SRF Black | | 40 |

An EPC black is an "easy processing" channel black; and an SRF black is a "semi-reinforcing" furnace black.

In preparing these formulations, the interpolymers were first broken down on a cold mill, the addition agents were milled into the interpolymer in the order named, and the mixture was sheeted from the mill. The sheet was shelf aged for 24 hours, refined, stripped and portions were cured at about 137–138° C. under a pressure of 400 pounds per square inch for specific periods up to about 75 minutes. The cured slabs were aged overnight at constant temperature and humidity, and were then tested for their physical properties. Similarly compounded and cured binary copolymers of vinylidene chloride and butadiene, and similarly compounded and cured commercially available synthetic rubbers of other polymeric compositions were tested in like manner, for comparison.

In a specific example, a ternary interpolymer (I) made from a monomeric mixture of 56 per cent vinylidene chloride, 30 per cent butadiene and 14 per cent acrylonitrile, a binary copolymer (I) made from a monomeric mixture of 55 per cent vinylidene chloride and 45 per cent butadiene, and a binary copolymer (II) made from a monomeric mixture of 70 per cent vinylidene chloride and 30 per cent butadiene were each compounded as Formulations A and B. It is noted that one binary contained about the same amount of butadiene as the ternary with which it was compared, while the other contained about the same amount of vinylidene chloride as the ternary. After milling, portions of the various samples were cured for 45 minutes at 137° C. and 400 pounds pressure per square inch. Samples of the vulcanizates were fastened on the turntable of an abrasion tester, and were subjected to abrasion by rotating abrasive discs, under standardized conditions, for 10,000 cycles of the turntable. The abrasion loss was determined and reported as loss in grams per hundred square inches per thousand cycles. The results are given in the following table:

| Interpolymer | Formulation | Abrasion Loss |
|---|---|---|
| Ternary I | A | 0.154 |
| Binary I | A | 0.534 |
| Binary II | A | 0.629 |
| Ternary I | B | 0.216 |
| Binary I | B | 3.50 |
| Binary II | B | 1.544 |

In each case the vulcanizates made from the new ternary interpolymers were superior to the comparable binary compositions.

Other abrasion tests were carried out in the same apparatus on molded samples of uncompounded and uncured interpolymers made from monomer mixtures containing 30 per cent butadiene, from 70 to 49 per cent vinylidene chloride, and correspondingly from 0 to 21 per cent of acrylonitrile. In tests run for equal periods of time, and under a standard load on the abrasive discs, the following results were obtained:

| Per Cent Acrylonitrile in the Interpolymer | Grams Loss in Weight of Sample |
|---|---|
| 0 | .0016 |
| 7 | .0012 |
| 10.5 | .000 |
| 14 | .0011 |
| 21 | .0184 |

It is apparent that the ternaries tested, containing from 7 to 14 per cent acrylonitrile, have better abrasion resistance than do the tested binary or the ternaries with larger amounts of acrylonitrile.

Other samples of the above-identified standard formulations containing the same ternary and the same binary polymers were cured at 137° C. for 30 seconds and still other samples were cured for 30 and 60 minutes, under a pressure of 160 pounds per square inch. Measurements were made of tensile strength, elongation, permanent set, tensile stress (modulus) at 100 per cent and at 300 per cent elongation, and hardness, all tests being made in the standard manner. Typical results are given below:

| Property | Cure—30 Seconds | | | Cure—30 Minutes | | | Cure—60 Minutes | | |
|---|---|---|---|---|---|---|---|---|---|
| | Ternary I-A | Binary I-A | Binary II-A | Ternary I-A | Binary I-A | Binary II-A | Ternary I-B | Binary II-B | GR-S compounded according to Formulation A, above |
| Tensile Strength | 840 | 345 | 330 | 2,630 | 2,510 | 2,400 | 2,000 | 1,900 | 740 |
| Elongation | 570 | 420 | 710 | 330 | 350 | 480 | 400 | 850 | 330 |
| Permanent Set | 16 | 30 | 36 | 10 | 10 | 18 | 8 | 18 | 6 |
| Modulus 100% | 250 | 215 | 150 | 450 | 410 | 315 | 290 | 170 | 160 |
| Modulus 300% | 500 | 345 | 250 | 2,310 | 2,000 | 1,320 | 1,375 | 670 | 655 |
| Hardness | 74 | 60 | 66 | 80 | 72 | 74 | 64 | 60 | 52 |

In every case it is seen that the compositions containing the ternary interpolymers had greater tensile strength and modulus together with lower permanent set values than did the corresponding binary copolymer compositions. It should be borne in mind that the compositions tested have not been designed for superiority in any particular property or for use in any specific manner, and that, by proper tailoring of the milled composition, cured products may be obtained which are somewhat softer or harder, or which have other permanent set values. The reported results afford a valid comparison of the standardized test compositions.

The solvent resistance of the new ternary interpolymers appears to be of the same general order as that of the polymerized chlorobutadiene type of synthetic rubber. In the comparison which follows, samples of commercially available synthetic rubbers which had been especially compounded by a rubber processor for use as tank-lining material, were tested along with samples of the new interpolymers compounded according to Formulation A. Strips of each specimen, 1 inch x 3/16 inch x 6 inches were bent through an arc of 180° and were clamped 3/4 inch below the peak of the fold. Each strip was nicked with a razor blade and a drop of benzene was placed in the nick. The crack was kept wet with benzene, and notice was taken of the time required for the specimen to break.

| Type of Rubber | Time to Break | |
|---|---|---|
| | Minutes | Seconds |
| Butadiene-Styrene | | 10 |
| Butadiene-Acrylonitrile | | 50 |
| Butadiene-Acrylonitrile | 1 | 50 |
| Neoprene (Chlorobutadiene) | 11 | 53 |
| Binary I-A | 6 | 10 |
| Ternary I-A | 9 | 40 |

In the same test, the new ternary, compounded as above described, was superior to the commercial tank lining formulations made from butadiene-styrene and butadiene-acrylonitrile synthetic rubbers, in resistance to toluene, and showed the same order of resistance to this solvent as did the commercially compounded chlorobutadiene tank lining material.

In the important matter of resistance to aromatic hydrocarbons the new ternary interpolymers are seen to be superior both to the vinylidene chloride-butadiene binary having the same amount of butadiene, and to the commercial butadiene-acrylonitrile binary. Similar tests, run with ethylene chloride as the solvent, also show the new ternaries to be superior to the same ones of the above-named commercially compounded synthetic rubbers. Again, it is to be noted that the new compositions had not been compounded specifically for resistance to solvents, whereas the commercial formulations used for comparison had been designed for this purpose. Resistance to swelling by solvents was measured by immersing the ends of rectangular strips of the compounded interpolymers in various solvents until no further swelling occurred, and noting the per cent increase in cross-sectional area. In this respect the ternaries of this invention were superior to the binaries containing like amounts of butadiene, in their resistance to such diverse solvents as cyclohexanone, dioxane, and carbon tetrachloride, and were superior to commercially compounded chlorobutadiene tank lining stocks in their resistance to swelling in dioxane and benzene. They were more resistant to swelling in such chlorinated solvents as tetrachloroethane than was the butadiene-acrylonitrile type of tank lining material.

Compounded and cured samples of ternary I-A are found to have a brittle point of −27° C., while samples of binary II-A have a brittle point of only −20° C. The crude (uncured) ternary has a brittle point of about −70° C., compared to −50° C. for the uncured binary.

In the important matter of electrical properties, the new ternary interpolymers are superior to similarly compounded and cured binary interpolymers containing like amounts of butadiene. This is shown in the following table, in which the interpolymers are identified in the manner previously employed. Tests in group (1) represent compositions containing a soft semi-reinforcing carbon black, while those in group (2) contain, instead, a like amount of a harder semi-reinforcing carbon. The formulations are otherwise those previously referred to as Formulation A.

| Property | Group 1 | | Group 2 |
| --- | --- | --- | --- |
| | Ternary I-A | Binary II-A | Ternary I-A |
| 1,000 Cycles: | | | |
| Dielectric Constant | 10.93 | 12.36 | 18.10 |
| Percent Power Factor | 7.72 | 13.71 | 24.96 |
| Specific Resistivity, D. C | 4.3×10¹¹ | 3.×110¹¹ | 1.1×10¹⁰ |
| Dielectric Strength, Volts/Mil | | | 47 |
| Arc Resistance, Seconds | 28.7 | 22.5 | 7.5 |

(Arc resistance was determined according to ASTM-D495-42).

Advantage is also found in the new ternaries over the vinylidene chloride-butadiene binaries in the matter of improved tear strength. Thus, in the standard test (ASTM-D624-41T), compositions compounded from the new ternary interpolymers as in Formulation A, and with twice as much plasticizer, and having tear strengths of 366 and 342, respectively, correspond to compositions containing the binary copolymer with tear strengths of 325 and 284.

The new ternary interpolymers have the distinct advantage of uniformity of composition, as compared with the vinylidene chloride-butadiene binary copolymers. This is apparently due to the effect of the acrylonitrile on the system during polymerization. Thus, in the binary system, due to the difference in polymerization rates, polymer removed after only 20 per cent of the monomers have polymerized is much higher in butadiene than is polymer later formed. When acrylonitrile is present as a third monomer, however, the interpolymer at each stage in the process, until completion, is very nearly the same as that produced at each other stage. This means that each interpolymer molecule is more nearly like the average molecule in the ternary system than is the case in the binary system.

In contrast to many synthetic rubbers, the new interpolymers are useful in their uncompounded and uncured, i. e. "crude," condition, because of their high combination of strength and elongation, their ease of molding, their viscous flow characteristics, and their extremely low permanent set, and other properties. The latices, themselves, which result from the emulsion polymerization, are useful in many cases for coating and film casting purposes.

Results similar to those here reported are obtained when isoprene (2-methyl butadiene-1,3) or 2,3-dimethyl butadiene-1,3 are substituted for the described butadiene-1,3 in the new ternary interpolymers. Similarly, small amounts of fourth polymerizable materials may be employed to form quaternary interpolymers. Thus, when 10 per cent of styrene is substituted for 10 per cent of the vinylidene chloride in the above-described ternary of 60-vinylidene chloride, 30-butadiene and 10-acrylonitrile (or for 10 per cent of acrylonitrile in the corresponding 50-30-20 ternary) the resulting quaternary interpolymer of 50-vinylidene chloride, 30-butadiene, 10-acrylonitrile and 10-styrene is very similar in properties to the ternaries first named. Other fourth components, such as ethyl acrylate, p-chlorostyrene, vinyl acetate, and the like, may be substituted in similar manner, with but slight modifying effect on the described ternaries when the amount of such component is below 10 per cent.

As previously suggested, the latices formed by the polymerization, in aqueous emulsion, of the herein described and preferred ternary mixture of monomers, may be employed, without prior coagulation of the interpolymer, for coating and film casting purposes. Thus, such a latex may be spread in any suitable manner, as by doctoring, brushing, spraying or dipping, on a smooth hard surface, such as glass or metal, and dried to form a coherent strippable film of any desired thickness, or it may be applied to a porous surface such as wood, cloth or paper and dried to form a coherent and adherent coating. The films so-produced are surprisingly tough and flexible and have a low moisture vapor transmission.

We claim:

1. A vulcanizable, rubber-like interpolymer made by dispersing in water and polymerizing together a monomeric mixture consisting of 56 per cent of vinylidene chloride, 30 per cent of butadiene-1,3 and 14 per cent of acrylonitrile.

2. A sulfur vulcanizate of the product claimed in claim 1.

3. A synthetic latex formed by the polymerization, while in aqeuous emulsion, of a monomeric mixture of 56 per cent vinylidene chloride, 30 per cent butadiene-1,3 and 14 per cent acrylonitrile.

GEORGE WILLIAM STANTON.
CHARLES EVERETT LOWRY.

REFERENCES CITED

The following references are of record in the file of this patent:

UNITED STATES PATENTS

| Number | Name | Date |
| --- | --- | --- |
| 2,313,233 | Fryling | Mar. 9, 1943 |
| 2,333,403 | Youker | Nov. 2, 1943 |
| 2,380,356 | Youker | July 10, 1945 |
| 2,380,905 | Stewart | July 31, 1945 |
| 2,394,406 | Schoenfeld | Feb. 5, 1946 |

Certificate of Correction

Patent No. 2,482,073 September 13, 1949

GEORGE WILLIAM STANTON ET AL.

It is hereby certified that errors appear in the printed specification of the above numbered patent requiring correction as follows:

Columns 7 and 8, last table, ninth column thereof, for the numeral "850" read $580$; column 9, in the table, third column thereof, for "$3. \times 110^{11}$" read $3.1 \times 10^{11}$; and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*